Oct. 4, 1927.
C. J. BENDER
BATTERY BOX
Filed March 30, 1923
1,644,641
2 Sheets-Sheet 1
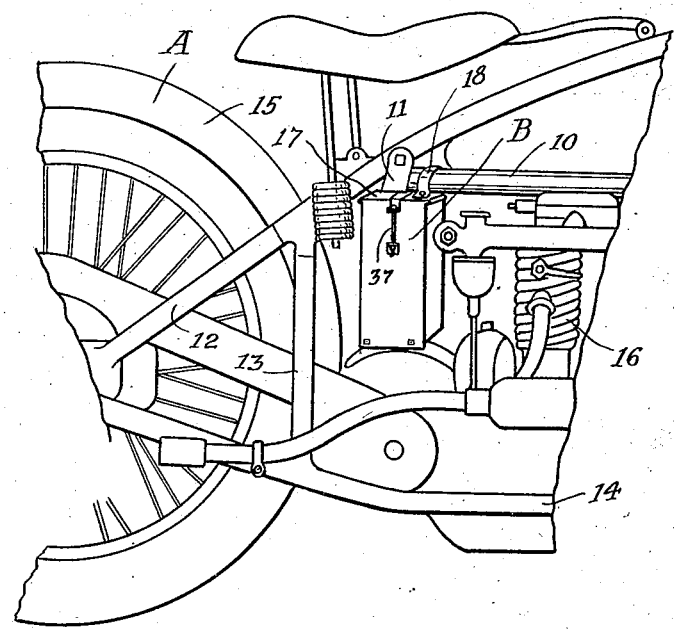
Fig.1
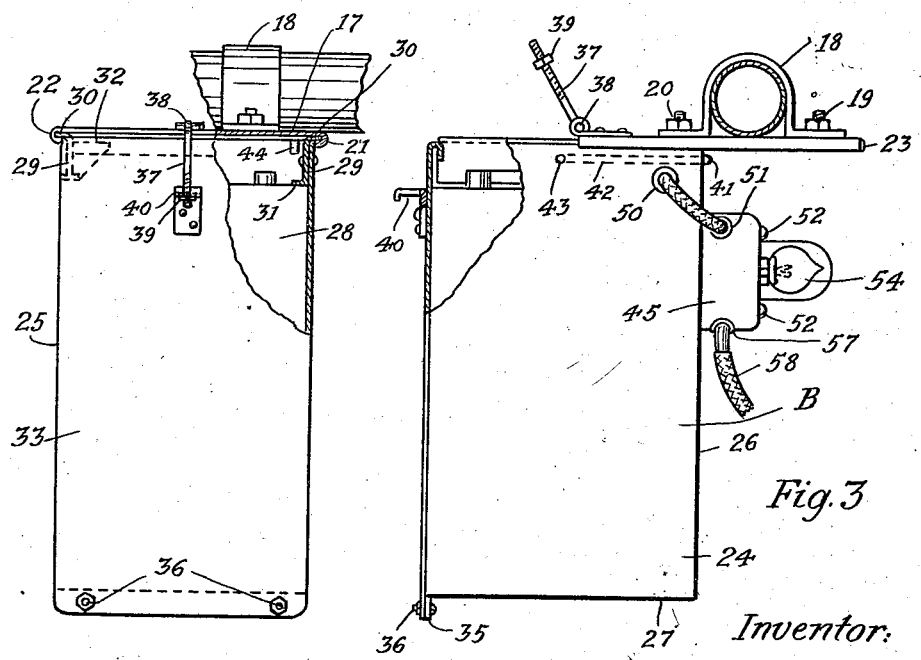
Fig.2.
Fig.3
Inventor:
Carl J. Bender
By Fischer Lagaard
his Attorneys.

Oct. 4, 1927.  1,644,641
C. J. BENDER
BATTERY BOX
Filed March 30, 1923  2 Sheets-Sheet 2
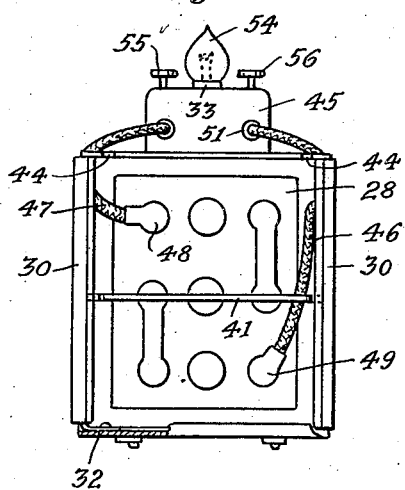
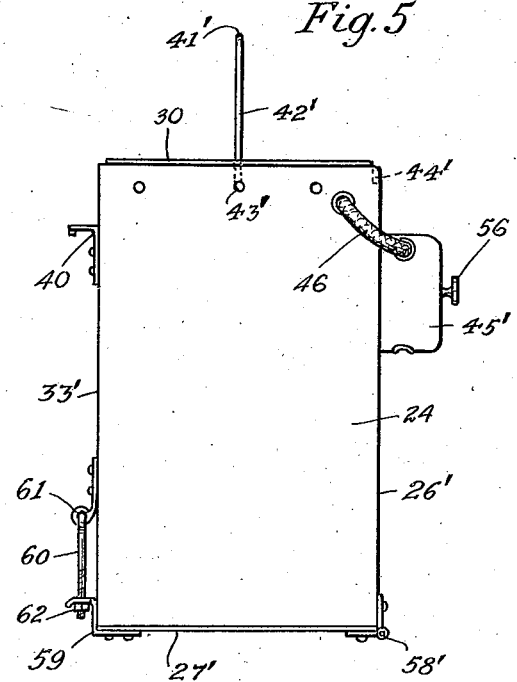
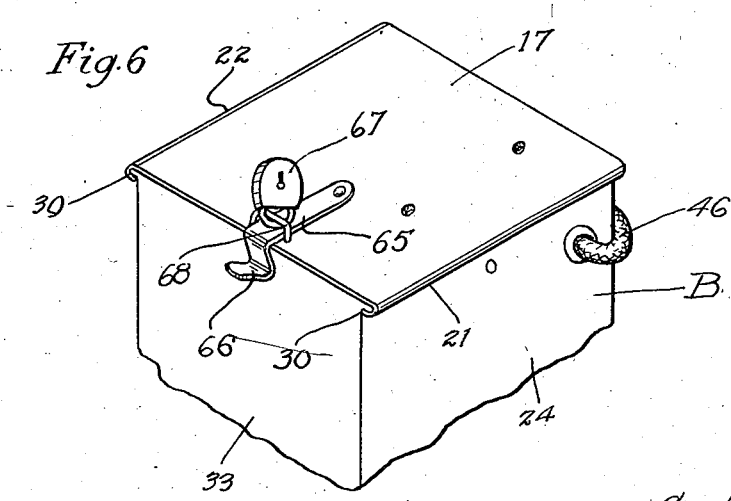
Inventor:
Carl J. Bender.
By Fischer & Sagaaus
his Attorneys.

Patented Oct. 4, 1927.

1,644,641

UNITED STATES PATENT OFFICE.

CARL J. BENDER, OF MINNEAPOLIS, MINNESOTA.

BATTERY BOX.

Application filed March 30, 1923. Serial No. 628,823.

My invention relates to battery boxes for motorcycles and has for its object to provide a container for the storage battery of a motorcycle which may be readily removed to give access to the battery for filling and inspection.

Another object is to provide a support secured to the framework of the motorcycle to which is detachably mounted a battery box carrying the battery of the motorcycle.

A still further object is to provide said support in the form of a horizontally positioned plate having guideways formed therein and to construct said battery box open at the top with guides adapted to operate in said guideways and to be held supported by said plate by means thereof and to provide latching means for holding said box attached to said plate.

A still further object is to provide the battery box with an electrical unit by means of which the connections to the battery can be made which unit also includes a lamp socket and lamp switch and to further provide the said box with a handle adapted to be folded out of use when the box is mounted in the support and adapted to be utilized when the box is removed so as to provide a portable lamp.

The invention includes an outwardly turned flange in the battery box against which the top of the battery is adapted to engage, which flange prevents the displacement of the battery or upward movement in the box and container. It is also a feature to provide a door or closure member for said box and through which the battery may be removed when desired.

The full objects and advantages of my invention will be found in the detailed description thereof and are particularly pointed out in the claims.

In the drawings forming part of this specification:

Figure 1 is a perspective view of a portion of a motorcycle showing my invention applied thereto.

Figure 2 is a side elevation of my invention with a portion of the same cut away to show the interior construction.

Figure 3 is a front elevation of my invention similar to Figure 2.

Figure 4 is a plan view of the battery and box detached from the motorcycle.

Figure 5 is a view similar to Figure 3 of an alternative form of my invention.

Figure 6 is a perspective view showing a modification of the invention.

In the battery boxes or containers now employed on motorcycles where space is limited and where the battery and box are quite inaccessible, batteries have not received sufficient attention and have thereby become run down and damaged. My invention overcomes this difficulty in providing a battery box which may be quickly removed so that the filling caps and terminals thereof are exposed and permit the filling of the battery without undue effort.

In Figure 1, I have shown my invention as attached to a motorcycle A, a portion of which is shown which comprises a complete frame having a horizontal member 10. A supporting casting 11 is secured to the rear wheel supporting frame members 12 and 13 and an engine supporting frame member 14 extends from the member 13. The rear wheel 15 of the motor cycle is mounted on the frame members 12 and 14, while the engine indicated at 16 is supported by the frame members 10 and 14, a little in advance of the frame member 13. The battery of the motorcycle is usually positioned between the engine 16 and the rear wheel 15 and is indicated in its supporting box at B.

For attaching my battery box to the motorcycle, I provide a plate 17 which fits beneath the horizontal motorcycle frame member 10. This plate is rigidly secured to frame member 10 by means of a clamp 18 which passes around the frame member and is secured to the plate by means of two bolts 19 and 20. If additional support is necessary, the same may be had by screwing the plate 17 to the casting 11 which, however, has not been shown in the drawings. The plate 17 is formed at the front and rear with inwardly turned edges 21 and 22 which form guideways in which the battery box may be slid and is retained. One of the side edges of plate 17 is formed with a flange 23 which forms a stop to limit the movement of the box B when connected and slid on the plate 17.

The construction of one form of my battery box B can be seen in Figure 3. This box comprises side walls 24 and 25, a back 26 and a bottom 27 which may all be secured together by means of riveting seams or welded joints, as may be desired. The battery, which is indicated at 28, is positioned within this box and is placed into the same through the front of box B, which is constructed opened as indicated.

For supporting box B on plate 17, two bars 29 are provided, which are riveted to the upper portions of the sides 24 and 25. These bars are formed with outwardly turned flanges 30 which project beyond the sides 24 and 25 and are adapted to slide into grooves along the guideways 21 and 22. In addition, the bars 29 are formed at their lower edges with outwardly turned flanges 31 which serve to engage the upper portion of the battery 28 and to hold the same firmly within the box B so that the battery is rigidly secured in place when the box is attached to plate 17. Two bars are provided with their ends adjacent the open end of the box bent out at right angles to form ends 32 which lie in the plane of the opening in the box. A closure member 33 is provided, which is formed with a hooked upper edge 34 adapted to hook over the ends 32 and to lie flush against the edges of the sides 24 and 25 of the box proper when so positioned. To hold closure member 33 in place, a downwardly turned flange is formed on the bottom 27 through which flange and cover, two bolts 36 extend to hold the same in place. With this structure, it can readily be seen that, when the battery is slid into the box through the opening in the same, the battery is firmly held in the box by means of the closure member 33 and flanges 31 on the bars 29.

For latching battery box B to the plate 17, I provide a threaded rod 37 which is hingedly connected at 38 to the outer edge of the plate 17. This rod carries a nut 39 which is adapted to engage a divided bracket 40 attached to the closure member 33 of the box proper. When the box is in place and rod 37 swung in between the divided portion of bracket 40 and nut 39 tightened, the entire structure is firmly held in place so that the same will not work loose due to the vibration of the motorcycle. It can readily be seen with this device that a structure is provided which permits of rapid removal of the battery box as a unit whenever it is desired to fill the batteries with water or to inspect the same.

In addition to the feature of detachably connecting the battery box, I provide in conjunction with the same a structure whereby the battery box may be readily carried about and may be used as a portable lamp, if desired. For this purpose, I provide a U-shaped bar 41 of rectangular shape having side members 42 positioned between the bars 29 within the box which side members terminate in trunnions 43 passing through the bars 29 and the sides 24 and 25 of the box proper whereby the bar is pivotally connected to the box proper. To clamp the bar 41 in place, when the battery is attached to the motorcycle, I provide two notches 44 in the back 26 of box B which are of a depth sufficient to permit the bar to lie beneath the upper surface of box B so that the same may be slid into place in the plate 17. It will be noted, that the side members 42 of bar 41 are made long enough so that the horizontal portion 44 of the bar lies without the box B along the upper surface of the back 26.

The electrical unit of my invention is best shown in Figures 3 and 4 and consists of a circular casing 45 which is attached to the rear or back 26 near the upper portion of the same. Two conductors 46 and 47 are connected to the terminals 48 and 49 of the battery 28 and pass through insulating bushings 50 secured to the sides 24 and 25 of the box proper near the rearward portions of the same immediately above the flanges 41 of bars 29. These conductors pass through similar bushings 51 in casing 45 and into the interior of the same where the proper connections can be made. The casing 45 may be attached to the back 26 of box B by means of screws 52, as shown or any other suitable attaching device. In the center of casing 45 is provided a light socket 53 in which may be positioned an electric light bulb 54. In addition, two switches 55 and 56 are employed which are positioned on the two sides of the socket 53 as follows:

At the bottom of casing 45 a jack 57 is employed in which a plug 58 may be inserted to make suitable connections with the ignition and lighting system of the motorcycle conductors 46 and 47 connected to both the light socket 53 and jack 57 and the two switches 55 and 56 connect with the circuits controlling the said socket and jack so that either may be turned on or off at will independent of the other. In using the battery for the lighting or ignition of the motorcycle, the plug 58 is inserted into jack 57 and the proper switch turned on. When it is desired to remove the battery, plug 58 is withdrawn and the light plug 54 inserted into socket 53 closing the switch 55, and the bulb may be lighted to provide a portable lamp, as previously described.

The modification of my invention shown in Figure 5 differs only from that shown in the other figures in that all of the sides including the closure member 33 are rigidly secured together for inserting the battery into the box. The bottom 27 is hingedly connected at 58 to the back 26 so that the battery is inserted into the box from the bottom of the same instead of through the side. For clamping the bottom in place, I provide a latching device similar to that used for securing the box to the plate 17. This device consists of a forked bracket 59 riveted to bottom 27 and a threaded rod 60 hingedly connected at 61 to the side member 33 of the box proper. A nut 62 on rod 60 is adapted to engage the forked portion of the bracket 59 to hingedly clamp the bottom of the box in place. This form of the invention has advantage over the other form in that the battery may be rigidly clamped against the flanges 31 of bars 29 so that the same is held from rattling when the motorcycle is operated.

In Figure 6, a perspective view is illustrated of the upper portion of the battery box B illustrating a spring snap catch 65, which is secured to the cover plate 17 in a manner so that, when the battery box B is slid into engagement with the cover 17, the free end 66 will engage over the edge of the box and hold the same in place connected to the plate 17. By means of an ordinary padlock 67, which is secured to the member 68, the free end or tongue 66 of the snap catch 65 can be held against disengagement with the wall of the box B to hold the same against disengagement. This will lock the battery in the box B so that it can not be tampered with without removing the lock 67.

Heretofore, motorcycles have been equipped with boxes to hold the storage battery and the construction is such that it is very difficult to get to the battery to test it or to put distilled water in the jars and to otherwise inspect the same. The equipment on a motorcycle is very compact and must necessarily occupy only a small space, so that the design must be accordingly and, therefore, the simplicity and effectiveness of my invention is apparent. The life of the battery is dependent on its care and the simple inexpensive design of my battery box will be fully appreciated, together with its usefulness by equipping it so that it is portable when detached from the plate.

In accordance with the patent statutes, I have described my invention, illustrating the best embodiment thereof, but I desire to have it understood that the invention can be carried out by other means and applied to uses other than those above set forth within the scope of the following claims:

I claim:

1. In combination with the frame of a motorcycle, a support permanently secured thereto, guideways formed on said support, a battery box, flanges formed on said battery box adapted to be engaged by said support guideways and means for latching said battery box in place on said support.

2. In combination with the frame of a motorcycle, a horizontally positioned plate rigidly secured to said frame, inwardly turned edges formed along two of the sides of said plate, a battery box, flanges formed on said battery box adapted to be slid along said inwardly turned sides for supporting the same and means for latching said box in place.

3. A battery box comprising a casing open at the upper portion thereof, bars formed along two sides of said casing, outwardly turned flanges formed on said bars and supporting means for engaging said flanges for holding said box supported.

4. A battery box comprising a casing, a pair of bars positioned within said casing near the top thereof, a pair of inwardly turned flanges formed on said bars positioned below the same, and a closure member for said casing.

5. In combination with a battery, a battery box therefor comprising, a casing of a length greater than said battery, stops formed in the upper portion of said casing adapted to engage the upper portion of said battery to hold the same within said casing and an opening and closure member for permitting the insertion of a battery into said casing beneath said stops.

CARL J. BENDER.